United States Patent [19]
Kolin

[11] 3,757,773
[45] Sept. 11, 1973

[54] EXTERNAL FIELD ELECTROMAGNETIC FLOW SENSOR-ARTERY

[75] Inventor: Alexander Kolin, Los Angeles, Calif.

[73] Assignee: Regents University of California, Berkeley, Calif.

[22] Filed: Mar. 22, 1972

[21] Appl. No.: 236,815

Related U.S. Application Data

[63] Continuation-in-part of Ser. No. 873,240, Nov. 3, 1969, abandoned, and a continuation-in-part of Ser. No. 166,235, July 26, 1971, abandoned.

[52] U.S. Cl............................ 128/2.05 F, 73/194 EM
[51] Int. Cl................................................ A61b 5/02
[58] Field of Search................. 128/2.05 F, 2.05 R, 128/2.05 V, 2 R; 73/194 EM, 194 R

[56] References Cited
UNITED STATES PATENTS

| | | | |
|---|---|---|---|
| 3,605,726 | 9/1971 | Williams et al.............. | 128/2.05 F |
| 3,347,224 | 10/1967 | Adams......................... | 128/2.05 F |
| 3,661,148 | 5/1972 | Kolin.............................. | 128/25 X |
| 3,098,383 | 7/1963 | West.............................. | 73/194 |
| 3,405,708 | 10/1968 | Webster...................... | 128/2.05 F |
| 3,479,871 | 11/1969 | Cushing..................... | 73/194 EM |
| 3,487,826 | 1/1970 | Barefoot..................... | 128/2.05 F |
| 3,516,399 | 6/1970 | Barefoot..................... | 128/2.05 F |
| 3,529,591 | 9/1970 | Schuette..................... | 128/2.05 F |

OTHER PUBLICATIONS

Kolin, A., Science, Vol. 130, 23 Oct. 1959, pp. 1088-1097.

Browning, C. et al., Med. & Biol. Engng., Vol 7, 1969, pp. 549-558.

Pieper, H. P., Review of Scientific Instr., Vol. 29, No. 11, Nov. 1958, pp. 965-967.

Kolin, A., Review of Scientific Instr., Vol. 24, No. 2, Feb. 1953, pp. 178-179.

Primary Examiner—Kyle L. Howell
Attorney—Warren T. Jessup et al.

[57] ABSTRACT

An electromagnetic catheter type flow sensor and artery gauge combination is provided which may be introduced into a blood vessel to measure, for example, the blood flow in the blood vessel or variations in the diameter thereof, and which is constructed to collapse its transverse dimension into a narrow elongated configuration as it is introduced from the outside into a blood vessel. The gauge of the invention includes a means, such as a coil, external to the patient or animal, and separate from the catheter portion of the gauge, for generating a magnetic field in the blood vessel. Since no magnets need be incorporated into the catheter probe, which has merely to contain electrodes for the pick-up of the signal, the catheter probe can be made of extremely small transverse dimensions.

44 Claims, 13 Drawing Figures

PATENTED SEP 1 1 1973

EXTERNAL FIELD ELECTROMAGNETIC FLOW SENSOR-ARTERY

This application is a continuation-in-part of copending application Ser. No. 873,240 which was filed Nov. 3, 1969 in the name of the present inventor for "Variable Gauge Electromagnetic Flow Meter with External Excitation", now abandoned, and of copending application Ser. No. 166,235 which was filed July 26, 1971 in the name of the present inventor for "Improved Electromagnetic Variable Gauge", now abandoned.

The invention described herein was made in the course of, or under, a grant from the U. S. Public Health Service, Department of Health, Education, and Welfare.

BACKGROUND OF THE INVENTION

The volume rate of flow in a blood vessel may be determined quantitatively by an externally applied electromagnetic flow meter, as described in an article by Alexander Kolin in O. Glasser ed Medical Physics, 3, 141/155, 1960. Such an application, however, requires surgical exposure of the blood vessel and often involves extensive surgery. This is often undesirable, and especially so if routine use is to be made of flow meters for clinical measurement of flow in the blood vessels of patients.

In order to overcome the limitations of the prior art electromagnetic flow meters, catheter-type flow meters have been developed which comprise an electromagnetic flow transducer incorporated into a thin, catheter-type tube, and which may be inserted into a branch blood vessel, such as the femoral artery or jugular vein, and from where it may be maneuvered into a major artery, such as the aorta or pulmonary artery; or vein, such as the vena cava. The term "catheter" as used herein is meant to imply that the instrument of the present invention is customarily inserted into the vascular system via a catheter.

However, the prior art catheter-type flow meters are still rather large, and are typically of from 3–4 millimeters in diameter. Such prior art catheter-type flow meters require larger openings in the blood vessel than would normally be considered safe, and instruments of the size described in the prior art, do not lend themselves practically to introduction percutaneously through a small opening in the skin of the patient.

Copending application Ser. No. 874,094, filed Nov. 3, 1969, now abandoned, describes an improved self-contained catheter-type electromagnetic sensor gauge in which the problem of excessive dimensions is solved, and which is constructed to comprise a transversely collapsible frame, together with an electric magnet coil and electrodes mounted on the frame. The assembly is collapsed in the transverse direction to have an elongated narrow configuration, so that it may be introduced percutaneously, for example, into the blood vessel of a patient.

As is well known, electromagnetic flow meters include means for producing a magnetic field across the path of the moving liquid, so that a voltage is generated as the liquid moves through the field, the voltage being directly proportional to the average velocity of the liquid. As is also well known, electromagnetic flow meters also include a pair of electrodes which are held in contact with the moving liquid, and on opposite sides of the liquid stream within the conduit carrying the liquid, so that the voltage induced in the liquid may be measured.

The improved catheter-type sensor gauge of the present invention differs from the gauge of the aforesaid copending application Ser. No. 874,094, in that the electric coil which creates the magnetic field of the flow meter of the present invention is positioned externally of the patient, and the catheter part of the flow meter comprises only the frame and the electrodes. This means that the catheter probe of the flow meter of the invention may be made much smaller in dimensions than the other; and it may be collapsed to a greater extent, so as to pass with greater ease and convenience through a narrower tube for percutaneous insertion thereof into a blood vessel of the patient. At the same time, the hazard of artifacts due to leakage currents from the field-generating coil to electrodes is avoided.

An important feature of the catheter-type sensor gauge of the present invention, as well as of the sensor gauge described in said application Ser. No. 874,094, is collapsibility in a transverse dimension. The gauge of the present invention may be reduced to a diameter, for example, of 1 mm., or less, which is required for successful and easy percutaneous insertion of the gauge through a catheter tubing passing through the patient's skin into the blood vessel.

In the embodiment of the flow sensor gauge to be described, for example, a resilient beryllium copper frame construction is used, so that when the sensor portion of the gauge is introduced through a narrow opening into a conduit such as a catheter or a branch blood vessel, its previously restricted transverse dimension enlarges resiliently and expands transversely until the assembly contacts the inner wall of the main blood vessel. This permits the frame of the gauge to adapt itself to the inner diameter of the conduit, e.g., artery or vein and thereby to measure the entire fluid flow across the conduit. Of great importance is also a special way of guiding the electrode leads so as to suppress the flow-independent quadrature e.m.f., a compensating circuit to further suppress it, if necessary, and utilization of wire loops incorporated into the sensor to provide a reference voltage for phase-sensitive detectors (see Kolin: Proc. Nat. Acad. Sci. 65, 521, 1970) to measure the artery diameter and its pulsations as well as the product of artery diameter times the effective magnetic field component, which is important for calibration.

Various catheter-type electromagnetic flow meters are described, for example, by C. J. Mills, Phys, Med. Biol. 11, 323 (1966); by R. F. Bond and C. A. Barefoot, J. Appl. Physol, 23,403 (1967); by Alexander Kolin, Proc. Nat. Acad. Sci. 57, 1331 (1967); by Alexander Kolin et al, Circulation Res., 21, 889 (1967); and by Alexander Kolin et al, Proc. Nat. Acad. Sci. 59, 808 (1968).

SUMMARY OF THE INVENTION

The invention provides an improved electromagnetic catheter-type variable gauge flow sensor which utilizes a magnetic field established within the blood vessel, or other conduit, by means of a magnet coil external to the conduit or to the patient or animal, and which includes a catheter probe which may be introduced percutaneously through a hollow catheter into the blood vessel or other conduit, and which is collapsible transversely to a very small lateral dimension while passing through a narrow channel, such as a hollow catheter, and expandable in a larger conduit so as to span its diameter. In addition to sensing flow, the probe also senses relative changes in the diameter of the conduit and can be used as a conduit or artery diameter gauge in a known magnetic field or in an unknown magnetic field as a gauge of the product of artery diameter times the effective magnetic field component, which determines the flow signal.

BRIEF DESCRIPTION OF THE DRAWINGS

FIGS. 9, 9A, and 9B are the preferred form.

DETAILED DESCRIPTION OF THE ILLUSTRATED EMBODIMENTS

Figures 1, 1B:
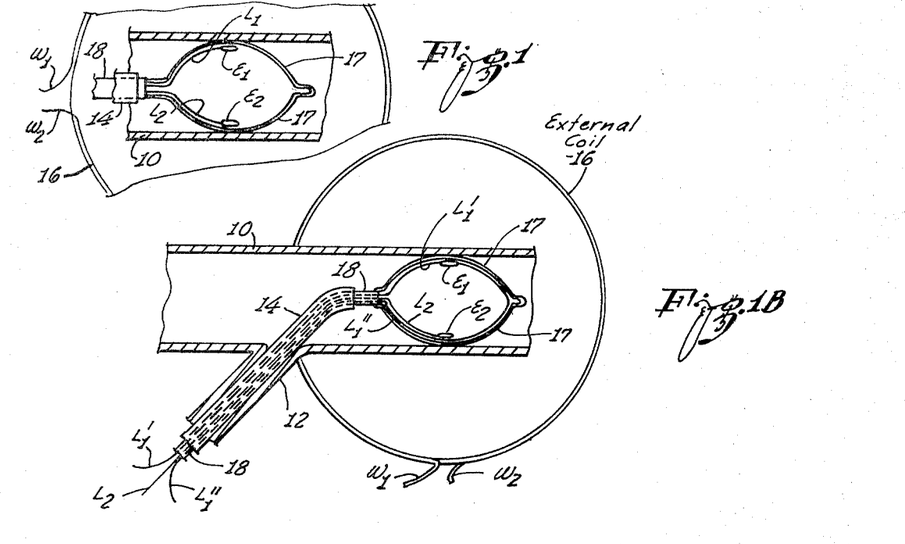
FIG. 1 is a schematic representation of an electromagnetic catheter-type sensor gauge constructed in accordance with the concepts of the present invention.
FIG. 1B shows a modification of the probe shown in FIG. 1 for compensation of the quadrature voltage and illustrating the adaptability of the present invention for insertion through a branch vessel into a larger blood vessel.

In the representation of FIG. 1, the sensor portion of the electromagnetic catheter flow sensor-diameter gauge of the present invention is illustrated as inserted into a conduit, such as blood vessel 10. The catheter unit includes a tub or insulating coating 18 through which two wires $L_1$ and $L_2$ extend, these wires being connected to electrodes $E_1$ and $E_2$ in a manner to be described subsequently and particularly in conjunction, for example, with FIGS. 1B, 6, and 9, 9A and 9B. The electrodes $E_1$ and $E_2$ are mounted on a terminally closed, loop-shaped, resilient frame 17, formed, for example, of beryllium copper wire, the ends of the loop being suitably affixed to the tube 18, or they may extend through the tube or coating 18 along with the electrode leads $L_1$ and $L_2$ toward the plug of the transducer. The wire joining the frame 17 is electrically insulated by a coating of Teflon or polyurethane, or other appropriate material which does not tend to coagulate blood. The electrode leads $L_1$ and $L_2$ are also insulated by a similar coating. Thus, only the electrodes $E_1$ and $E_2$ actually are in electrical contact with the blood in the blood vessel 10. 14 is the tip of an angiographic catheter which is introduced into the blood vessel 10 through one of its branches by standard percutaneous technique and through which the frame 17 is passed into the blood vessel 10.

Figure 1A:
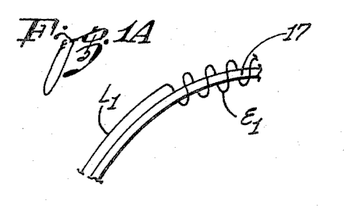
FIG. 1A is a fragmentary representation showing a possible configuration for the electrodes of the gauge.

The electrodes $E_1$ and/or $E_2$ may be for instance formed, as shown in FIG. 1A, merely by wrapping a few turns of bare wire at the ends of the insulated leads $L_1$ or $L_2$ around the insulated wire 17 forming the frame of the probe.

It will be appreciated that the catheter probe section of the flow meter, which is made up of the flexible wires within the enclosure 18 and the wire frame 17, may be collapsed to a restricted transverse, or lateral, dimension, to be inserted into the blood vessel 10 through the catheter 14 and branch vessel 12 after passing through a small opening in the skin through which the angiographic catheter 14 is introduced. Once the sensor gauge is in the blood vessel 10, the sides of the frame 17 resiliently expand to assume the position shown in FIG. 1, with the sides engaging the inner wall of the blood vessel 10, and spreading the electrodes $E_1$ and $E_2$ so that they are disposed on opposite sides of the stream of fluid passing through the blood vessel. The probe section can also be used even when it is not expanded to the full diameter of the vessel 10; and in such case it operates as a velometer, rather than a volume rate of flow meter.

A magnetic field is created in the blood vessel in the space between the electrodes $E_1$ and $E_2$ by means, for example, of an external coil 16, through which a magnetic-field-creating current (preferably AC) is passed, through leads $W_1$ and $W_2$. The external coil 16 may have any appropriate configuration to create the desired magnetic field in the conduit 10. The external coil 16 may be shaped for example, as a cradle, (FIG. 3A) so that the patient may lie within the coil. Alternatively, smaller coils 16 may be made, and have a cradle-like configuration, into which an arm or a leg of the patient may be placed. The coil may also be round and flat as shown in FIG. 1; and the patient may be above, beside or below the coil. Alternatively, two or more coils may be used and the patient may be sandwiched between them.

Figure 2:
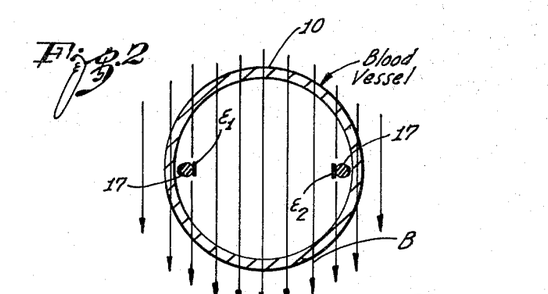
FIG. 2 is a cross-section of the blood vessel of FIG. 1, on an enlarged scale, and showing the magnetic field which is set up by the external coil of the present invention and which traverses the blood vessel.

The coil 16 may have any desired number of turns so as to produce the desired magnetic field B across the conduit 10, as shown in FIG. 2. In FIG. 2, the blood vessel 10 is shown on an enlarged scale as a transverse section. The alternating current coil 16 (not shown in FIG. 2) generates an alternating magnetic field having a component in the illustrated direction in FIG. 2 (symbolized by the vectors B) across the blood vessel 10, so that the fluid flowing through the blood vessel flows transversely through the magnetic field and develops an alternating voltage which is picked up by the electrodes $E_1$ and $E_2$. The electrodes $E_1$ and $E_2$ are preferably platinized, or otherwise treated to exhibit "non-polarizable" characteristics.

The resilient frame 17 may be composed, for example, of a single wire of 9 mil beryllium copper bent in hair pin fashion at the right-hand (closed) end, the enclosure or coating 18 may be, for example, Teflon or polyurethane, or other appropriate insulating material, as mentioned above. The wire frame 17, as also mentioned, may be coated with similar insulating material. The wires $L_1$ and $L_2$ may be copper wires insulated by polyurethane, or Teflon, or other suitable insulating material.

Figure 3:
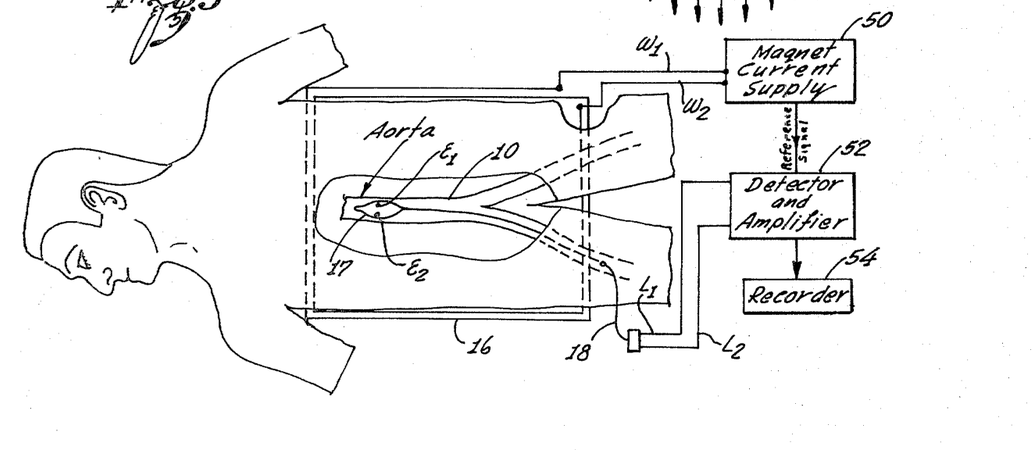
FIG. 3 is a schematic representation of one embodiment of the improved electromagnetic sensor gauge of the present invention, and also showing in block form certain electrical components associated therewith.
Figure 3A:
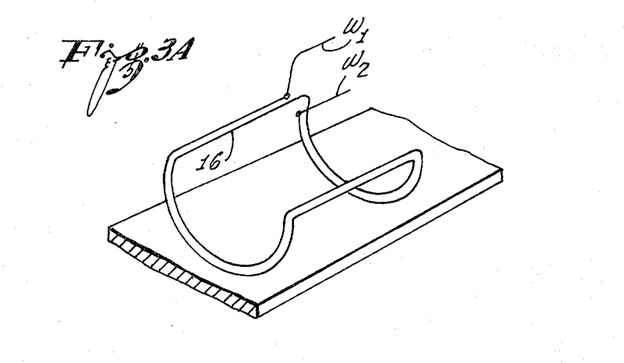
FIG. 3A is a perspective representation of one embodiment of an external coil used in the assembly of the invention.

The coil 16 may have any desired cross sectional shape, as noted above. It generates an alternating magnetic field at right angles to its plane. This field permeates the patient and the blood vessel into which the catheter frame with its electrodes $E_1$ and $E_2$ is inserted, so that the line joining the electrodes is preferably perpendicular to the magnetic field. The magnetic field need not be, but preferably is, uniform. In FIGS. 1 and 3, the magnetic field is perpendicular to the page.

A stream of blood is assumed to traverse the cross section of the blood vessel 10 shown in FIG. 2 at right angles to the plane of the drawing. As a result, an alternating electromotive force V, will be induced in the conductive fluid and this electromotive force will be detected by a potential difference between the electrodes $E_1$ and $E_2$. The flow-induced peak electromotive force $V_o$ may be calculated from the expression:

$$V_o = 10^{-8} B_o \cdot d \cdot v. \quad (1)$$

where: $B_o$ is the peak magnetic field component extending perpendicular to the inter-electrode axis in FIG. 2 and across the plane of the frame,
$d$ is the inter-electrode distance, and
$v$ is the average fluid velocity.

The flow meter measures the average rate of flow through the artery. It can also measure the volume rate of flow, since it is given by the product of artery cross section "$A$", times the average fluid velocity "$V$". The cross-sectional area $A = (\pi/4)d^2$ can be obtained from the value of artery diameter $d$ which is revealed by an x-ray radiogram of the expanded probe loop in the artery.

Because of the flexibility and deformability of the flow meter probe described above, which is essentially a split section catheter, it may be maneuvered into side branches of the arteries in accordance with standard angiographic practice and thus be able to measure blood flow through organs supplied by the chosen branch. The diameter of the artery whose flow is being measured must also be known to ascertain the volume flow sensitivity of the transducer. This diameter may be obtained with x-rays, with the frame of the flow meter appearing as a shadow in the x-ray radiograph and its transverse dimension indicating the internal diameter of the artery when the frame is oriented so as to yield a maximum width of frame in projection on the x-ray film.

In FIG. 1B there is illustrated a modification of the probe illustrated in FIG. 1 in which the lead $L_1$ connected to the electrode $E_1$, instead of terminating at $E_1$, continues around contiguous to the frame 17 and emerges through the enclosure or coating 18 as lead $L_1''$. For purposes of identification in FIG. 1B, the shorter of the two leads $L_1$ connected to $E_1$ has been denominated $L_1'$. The two portions $L_1'$ and $L_1''$ of the loop thus formed provide a phase sensing loop which, by suitable connection to $L_1'$ and $L_1''$, give a read out of signal induced in the loop by the alternating magnetic field generated in the loop 16. This loop signal may be monitored and either employed through manual control or automatically through automatic gain control to adjust the detector and amplifier circuit to which the electrodes $E_1$ and $E_2$ are connected, as more fully explained hereinafter. Another important use of the voltage induced in the loop is to adjust the phase-sensitive detector so as not to sense this voltage (see A. Kolin: Proc. Nat. Acad. Sci. 65, 521, 1970). Then the amplifier senses the flow signal optimally and is insensitive to the flow-independent quadrature voltage. FIG. 2B also illustrates the manner in which the catheter may be inserted into the vessel 10 through a branch vessel 12.

The system of FIG. 3 shows the manner in which the external coil 16 may be energized from an appropriate alternating current source 50 to which the leads $W_1$ and $W_2$ are connected, so that an alternating magnetic field may be produced within the blood vessel, such as the aorta of the patient. The leads $L_1$ and $L_2$ from the electrodes $E_1$ and $E_2$ supply the induced alternating voltage signals to an appropriate detector and amplifier 52, and the resulting amplified signal is applied to a recorder 54, so that a record of blood flow may be made. The alternating current source 50, as well as the detector and amplifier 52 and recorder 54, are well established electrical units and need not be discussed in detail.

A problem in the use of the external coil assembly shown in FIGS. 1, 2, and 3 is that of changes of the orientation of the electrode frame relative to the fixed magnet coil 16, and of variations in the position of the electrodes $E_1$ and $E_2$ within the magnetic field of the external magnet coil 16. Also, for different sized conduits, the spacing $d$ between the electrodes $E_1$ and $E_2$ varies. A system for monitoring and/or compensating for flow probe sensitivity variations due to the effect of changes in the inter-electrode distance, as well as for variations in the local magnetic field intensity, and for changes in the angle between the plane of the frame 17 the magnetic field is shown in FIG. 4.

Figures 4, 5, 6:
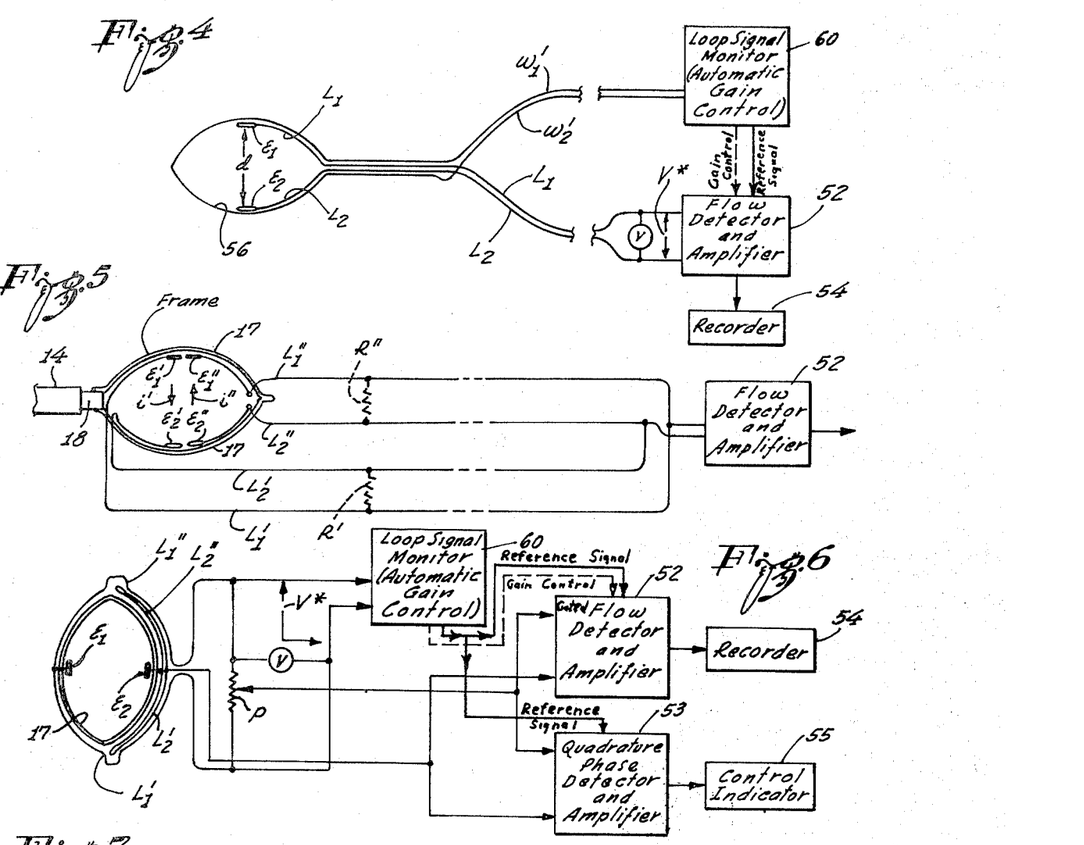
FIG. 4 is a schematic representation of the sensor portion of one embodiment of the invention, and illustrating the manner in which an electrical system may be used for compensating differences in inter-electrode distances of the probe, and for variations in the local intensity and/or direction of the magnetic field, as the relative position of the external coil and internal sensor changes, and as the blood vessel expands or contracts.
FIG. 5 is a schematic representation of a catheter-type flow sensor illustrating the concept of the present invention, and which includes means for compensating quadrature error voltages generated by the probe.
FIGS. 6 and 7 show further possible compensating systems and circuits for the suppression of the quadrature error voltage.

In the representation of FIG. 4, an insulated loop of wire 56 extends around the resilient frame 17 (omitted for clarity in FIG. 4). The insulated wire loop is connected, for example, by leads $W_1'$ and $W_2'$ to a quadrature voltage or loop signal monitor 60, which may be combined with an automatic or manual gain control (or any other sensitivity monitor). The automatic or manual gain control monitor 60 serves to monitor and control the gain of the amplifier portion of the detector and amplifier 52, in accordance with variations in the distance between the electrodes $E_1$ and $E_2$, and in the magnetic field intensity component perpendicular to the plane of the frame caused by changes in the orientation and position of the probe.

The induced quadrature voltage is:

$$V^* = 10^{-8} A \, dB/dt \quad (2)$$

where: $A$ is the loop area.

Figure 8:
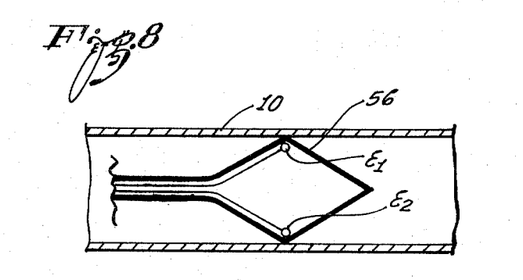
FIG. 8 is a fragmentary form illustrating an alternate form of probe which may be employed.
Figure 9:
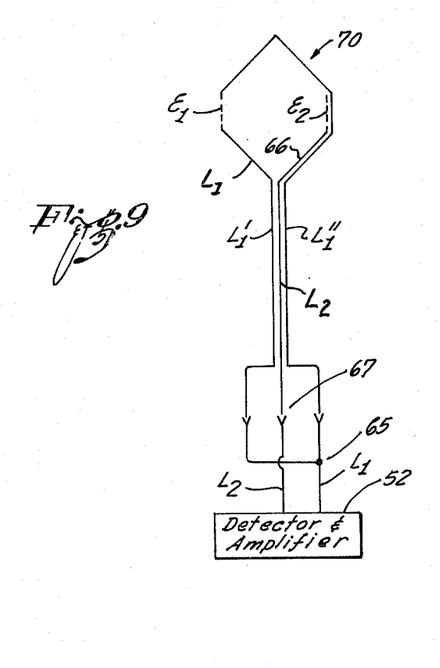
FIG. 9 is a schematic representation of yet another embodiment of the improved flow sensor-diameter gauge of the invention.

There is a functional correlation between the area A and the inter-electrode distance "$d$". It is roughly approximated by a linear relation for changes in "$d$" not exceeding 50 percent. However, for accurate calibration a correlation curve between "$d$" and "$A$" should be used. It should be pointed out, however, that if the frame 17 as well as the loop 56 is a rhombus, as shown in FIG. 8 or a hexagon as shown in FIG. 9, instead of the curved shape of FIG. 1, then the relationship between $A$ and $d$ is linear to within a few percent, over a wide range of compression of the inter-electrode distance down to about fifty percent of the original value in the fully expanded frame.

In the flow meter of the type under consideration, the peak value $B_o$ of the magnetic field remains essentially constant, whereas the inter-electrode distance "$d$" changes for different diameter conduits in which the flow meter is used. In addition, the component of the magnetic field which is effective in inducing the flow signal voltage varies with changes in orientation of the sensor loop, and it also varies with changes in the position of the loop frame within the non-uniform magnetic field of the coil 16. Therefore, a compensation is made by measuring the changing value of $B \times A$ by the auxiliary compensation loop formed by the wire 56. (The voltage derived from the loop wires $L_1'$ and $L_1''$ in the modification shown in FIGS. 9 and 9A can be used in the same fashion.)

For a sinusoidal field we have:

$$B = B_o \cdot \sin \omega t \quad (3)$$

Hence:

$$dB/dt = -B_o \cdot \omega \cdot \cos \omega t \quad (4)$$

and the quadrature voltage $V^*$ induced in the loop is $$V^* = 10^{-8} \cdot A \cdot dB/dt = -10^{-8} \cdot A \cdot B_o \cdot \omega \cdot \cos \omega t \quad (5)$$

and its peak value is:

$$V_o^* = 10^{-8} \cdot \omega \cdot A \cdot B_o = 10^{-8} \cdot \omega \, (fd) \, B_o \quad (6)$$

where: $(Fd) = A$, $f$ being a factor equal to the ratio of loop area to loop diameter (i.e., diameter of the conduit in which the loop is confined).

The overall sensitivity "$S$" of the flow meter will include the amplification "$a$" of the amplifier, so that it can be measured at a given AC frequency by the peak quadrature signal $S_o$.

$$S_o = V_o^* a = 10^{-8} \omega f \, a d \, B_o \quad (7)$$

The peak quadrature voltage $V_o^*$ picked up from the compensating loop 56 is proportional to both the loop area $A$ and the component of the field intensity $B$ normal to the frame 17. Due to the relationship $A = fd$, we can also say that $V_o^*$ measures the product of the magnetic field component $B$ and the conduit diameter $d$ when the factor $f$ is known. The values of $f$ are established by a calibration curve of $A$ versus $d$.

When the rhombus frame and compensating loop 56 of FIG. 8 are used or the hexagonal loop of FIG. 9, as mentioned above, "$f$" becomes practically constant over the useful compression range and, for most purposes, a sufficiently rigorous linear relationship between $A$ and $d$ can be assumed. The voltage developed by the auxiliary loop 56 (of FIG. 4), or loop 70 (of FIG. 9 and 9A) will then measure the product $dB$, and it may be applied to a typical automatic gain control circuit 60 (or other sensitivity indicator as noted) which includes internal connection circuitry which generates the variable factor $f$. The manual or automatic gain control circuit 60 controls the gain of the amplifier 52 so that the product $aB_o d$ in Equation (7) is held constant, regardless of changes in position, orientation, or lateral dimension of the frame 17 or loop 60. This means that the read-out of the flow measuring apparatus will depend only on the velocity of the fluid passing the catheter probe, and will be independent of variations in the distance between the electrodes $E_1$ and $E_2$, and of frame orientation in the magnetic field, and of changes in magnetic field intensity in the plane of the frame 17, as the catheter probe section is placed in conduits of different diameters, and/or is moved into different positions within a nonuniform magnetic field, and/or changes its orientation within the magnetic field. Determination of the volume rate of flow requires separate knowledge of the conduit diameter $d$. The latter can be obtained, for example, by x-rays as is indicated by the shadow of the frame 17 in a radiograph.

Instead of using an automatic gain control 60, a meter V (FIG. 6) can be used in its place to measure the $emf$ induced in the loop 56 or between the terminals of the loop sections $L_1'$ and $L_1''$ in FIGS. 1B, 7, 9, and 9A, at first when the loop is in a standardizing reference position and at optimum orientation in the magnetic field. Then, variations in the meter reading, when the loop assumes other positions and orientations in the course of flow measurements, will indicate the sensitivity factors which must be applied to readings on the recorder 54 for such practically encountered positions and orientations of the flow sensor loop.

A major problem in all alternating field electromagnetic flow meters is the appearance of an error signal in phase quadrature with respect to the actual flow signal, and which is independent of fluid flow. This "quadrature error" signal is of the same nature as the signal picked up by the loop 56 in FIG. 4, and it may be orders of magnitude above the flow signal and should be suppressed, even when phase-sensitive detection is used. The following consideration provides the insight which suggests a simple and very effective compensation system which removes the zero error.

The frame 17 formed by the insulated resilient wires, as shown in FIG. 5, is equipped with two electrode pairs $E_1'$ and $E_2'$ and $E_1''$, $E_2''$, with leads $L_1'$ and $L_2'$ connected to the electrodes of the first pair, and with the leads $L_1''$ and $L_2''$ connected to the electrodes of the second pair. If the leads $L_1'$ and $L_2'$ are assumed to be bridged by the resistance $R''$, the $emf$ induced in the loop represented by $L_1'$, $L_2'$, $E_1'$ and $E_2'$ by an alternating magnetic field perpendicular to the plane of FIG. 5, will produce a current $i'$ flowing between the electrodes $E_1'$ and $E_2'$ in the direction shown in FIG. 5, and will produce a voltage between the electrodes. The same field will induce an emf in the same sense in the loop $L_1''$, $L_2''$, $E_1''$, $E_2''$, and a corresponding current $i''$ will flow in a direction opposite to $i'$ providing a voltage across the electrodes $E_1''$ and $E_2''$ of the opposite polarity to the voltage across the electrodes $E_1'$ and $E_2'$.

If now the electrode $E_2'$ is connected to the electrode $E_2''$, and the electrode $E_1'$ is connected to the electrode $E_1''$, and if the two opposite voltages between the electrode pairs are equal in magnitude, the potential difference between the joined electrodes will now be zero. In this way, the quadrature voltage, which is induced at zero flow of the liquid and which is independent of the fluid flow, may be cancelled out. However, there is no cancellation or weakening of the flow-induced voltage, so that while the quadrature error signal cancels out the actual flow signal does not.

It is obvious that the same cancellation will exist with two electrodes $E_1$ and $E_2$, such as shown in the system of FIG. 6, if they are properly centered in the loop, since two inter-connected contiguous electrodes $E_1'$, $E_1''$ or $E_2'$, $E_2''$ are pairwise equivalent to one single electrode $E_1$ or $E_2$. It is therefore possible to obtain a perfect zero signal at zero flow by using two electrodes $E_1$ and $E_2$, and by moving one or both of them up or down until a zero quadrature signal is registered at zero flow. Such a mechanical adjustment, however, is critical and cumbersome. It is therefore desirable to replace the mechanical adjustment by an electrical balancing method, such as shown in FIG. 6.

The electrodes $E_1$ and $E_2$ in FIG. 6 are mounted on the insulated resilient frame 17, as in the previous embodiment. In the circuit of FIG. 6, the leads $L_1'$ and $L_1''$ are both connected to the electrode $E_1$, and these leads extend half way around the frame 17 and are connected to opposite terminals of a potentiometer P. Similarly, the leads $L_2'$ and $L_2''$ are both connected to the electrode $E_2$, and these latter leads extend around the other half of the frame. The leads $L_2'$ and $L_2''$ are connected together and, these leads and the wiper of potentiometer P are connected across the input of the detector and amplifier 52 which, in turn, is connected to the recorder 54. The input to the (automatic) gain control monitor 60 is connected across the potentiometer P. Paralleled with 52 is a quadrature phase detector and amplifier 53. The amplifier 52 may be made responsive only to the flow-determined signal from the electrodes $E_1$ and $E_2$ of the flow meter which is in phase with the magnetic field, whereas the detector 53, as well as the manual or automatic gain control circuit 60, are responsive only to the error signal from the electrodes and the emf induced in the wire loop 56, which are in phase quadrature relative to the magnetic field. To insure response of the flow detector 52 to the flow signal only, the gate of its phase-sensitive detector is controlled by a reference voltage derived from the signal fed from loop 56 or potentiometer P into the gain control circuit 60 and branched off to flow detector 52. The gate is adjusted so that zero output is derived from amplifier 52 when the loop output, normally connected to 60, is applied to the input of 52 (see Glasser: Medical Physics, Vol. 2, p. 141. Yearbook Publ. Co. 1960). To suppress the zero error due to probe assymmetry, the wiper on the potentiometer P is adjusted until the indicator 55, connected to the output of the quadrature phase detector and amplifier 53, indicates zero, thus eliminating the quadrature voltage without mechanical adjustment.

The aforesaid calibrating signal "$V^*$" of FIG. 6 appears across the potentiometer P and may be applied to the automatic gain control 60, as well as to the flow detector 52 to provide the reference voltage for the phase-sensitive detector as shown. Instead of using three separate electronic channels, as represented by the blocks 52, 53, and 60; one single phase-sensitive electronic channel with phase control may be used to monitor the flow signal, the quadrature voltage and calibrating signal $V^*$ in succession rather than simultaneously, as shown in FIG. 6. The reference voltage for this electronic channel may be provided by the magnet current supply as is often done in standard electromagnetic blood flow meter electronic channels as indicated in FIG. 3.

It is apparent that both the detectors and amplifiers 52 and 53 are phase sensitive, with the detector and amplifier 52 being responsive only to the in-phase flow determined signal from the electrodes $E_1$, $E_2$, and with the quadrature phase detector and amplifier 53, as well as the automatic gain control circuit 60, being responsive only to the quadrature phase voltage which is 90° out of phase with the magnetic field. With such arrangement it is most advantageous to use the system of FIG. 6 or FIG. 7 so as to maintain the flow detector 52 insensitive to the quadrature voltage and the quadrature signal applied to the detector 53 at zero amplitude, to ensure an output from the flow detector and amplifier 52 of zero magnitude at zero flow. Then a proper base line may be achieved by short-circuiting the output of the detector 52, since the base line obtained by short circuiting the amplifier output is then the same as the base line obtained by stopping the liquid flow.

Figure 7:
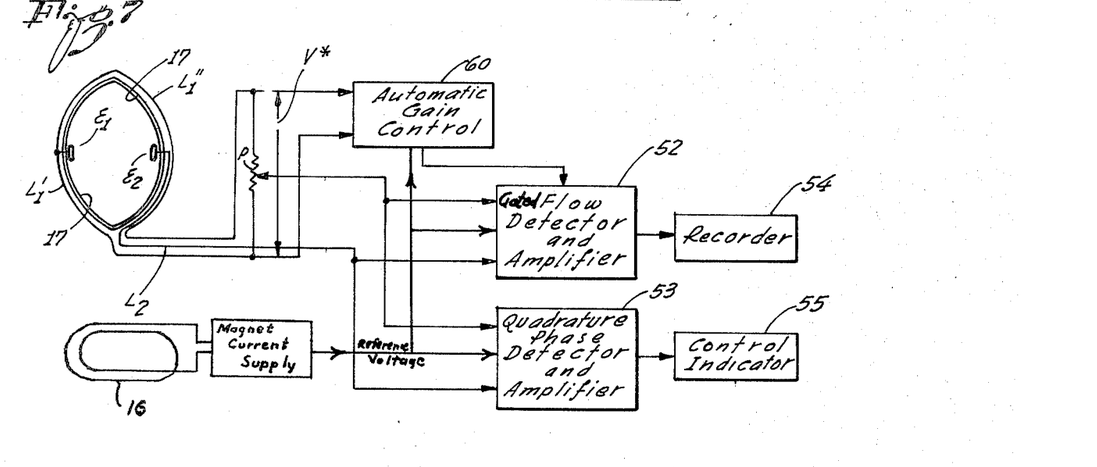

It is clear that the wire leads $L_2'$ and $L_2''$ connecting the electrode $E_2$ to the amplifier input in FIG. 6 may be replaced by one single lead $L_2$, as shown in FIG. 7. The system of FIG. 7 employing the probe of FIG. 1B, is presently the preferred embodiment, and is equally effective as the circuit of FIG. 6. However, the circuit of FIG. 7 has the advantage of greater simplicity in construction. As in the circuit of FIG. 6, the quadrature voltage drop $V^*$ across the potentiometer P may be used as a measure of the product of the inter-electrode distance d multiplied by the component of the magnetic field B which is normal to the plane of the frame 17, in the manner described above in conjunction with the compensating system of FIG. 4. As in FIG. 6, the quadrature phase detector and amplifier 53 is connected in parallel with the flow detector and amplifier 52, as shown, and the latter derives its reference voltage from the potentiometer or the loop connected across the potentiometer via current 60. To obtain the volume rate of flow, the artery internal diameter may be determined, for example, as suggested above by the x-ray shadow of the contour of the frame 17 in the radiograph. The measured average flow velocity value multiplied by the artery cross-section gives the volume rate of flow.

Referring to FIG. 9, there is illustrated a catheter probe sensor generally designated as reference numeral 70 measuring the blood flow in a similar manner as the embodiments previously described. The catheter probe sensor 70 is comprised of a loop which may be, for example, a Teflon insulated beryllium copper wire 0.2 mm. in diameter. A portion $E_1$ of the loop 70, from which the insulation is removed, acts as one of the electrodes and thus greatly reduces the lateral dimensions of the catheter probe. A thin Teflon insulated copper wire 66 (for instance 3 mil) bonded to the loop 70 has its insulation removed opposite electrode $E_1$, thus forming the electrode $E_2$. The wire 66 need not terminate at the end of electrode $E_2$ as shown. It may continue beyond it with its insulation intact and be bonded to loop 70 (Note FIG. 9A). The two electrodes $E_1$ and $E_2$ are produced by scraping the Teflon insulation from the conductors (beryllium copper and then copper wires, respectively) along their respective sections designated $E_1$ and $E_2$. These electrode areas are platinized prior to use. If desired, as noted, the thin insulated copper wire leading to electrode $E_2$ may continue around the frame, extending beyond the electrode $E_1$, and terminating without being connected to anything (See FIG. 9A). To increase the electrode area, it is advantageous to paint silver paint around the electrodes and the adjacent insulated wires. After the silver paint has dried, it is coated, for example, electrolytically by a thin layer of gold and is subsequently platinized. One can also platinize the silver paint without prior gold plating. Polyurethane insulated wires can also be used with the added advantage of easier methods of bonding the wires to each other.

The terminal ends $L_1'$ and $L_1''$ of the frame or terminally closed loop 70 are joined together at junction 65 to form the lead $L_1$, which is connected to one terminal of the detector and amplifier 52. The copper wire 66 has its terminal end 67 connected to lead $L_2$ which is coupled to the other terminal of the detector and amplifier 52. Testing has shown that it is preferable that the frame or loop 70 shown in FIG. 9 have a hexagonal shape, with electrodes $E_1$ and $E_2$ lying on opposite sides as shown. Other polygonal shapes can also be used advantageously instead of the lenticular loop shapes shown heretofore.

If desired, the catheter sensor 70 may be used as an artery diameter gauge in a constant amplitude alternating magnetic field to measure the diameter of the conduit (and especially its pulsatile variations), such as the blood vessel. Thus, if the terminal end 67 of the copper wire 66 is disconnected from the lead $L_2$, and the terminal end of $L_1'$ is connected to the lead $L_2$ instead of wire 66, the loop, acts as a secondary of a transformer yielding a signal which is in phase quadrature relative to the flow signal and the magnetic field of the external coil 16. The induced voltage therein is proportional to the area A of the loop.

For the lenticular shape of the loop, shown in FIG. 1 and especially the hexagonal shape of FIG. 9, the loop area is proportional to the inter-electrode distance between $E_1$ and $E_2$ to a practically sufficient degree of approximation over a wide range. The variations in the signal output derived from the leads $L_1'$ and $L_1''$ of the loop provide information about relative changes in the artery diameter in an alternating magnetic field of constant amplitude. Thus pulsations of the artery diameter are given as a percentage of the maximum diameter. In a known magnetic field, a loop 70 oriented with its plane perpendicular to the field permits absolute measurement of the artery diameter. By varying the orientation and distance of the loop from the magnetic coil 16, a varying transformer signal may be obtained, which provides information about variations in the magnitude of the magnetic field component perpendicular to the loop area, and hence, in the sensitivity of the flow sensor for a conduit of constant diameter. Since the signal from the transformer secondary is proportional to the product $BA$, (Where A is the loop area and B the magnetic field component perpendicular to this area and the only field component responsible for induction of the transformer emf as well as of the flow signal) and its area A is proportional with a good degree of approximation to the diameter $d$ of the confining conduit, then the signal induced in the loop 70 will be approximately proportional to $Bd$ and will be a measure of the sensitivity of the flow sensor, not only in a conduit of constant diameter, but also in conduits of different diameters.

Thus, the sensitivity ratio for two tubes or conduits of arbitrary diameters in magnetic fields of different intensity and orientation will be given by the ratio of the transformer signals derived from the leads $L_1'$ and $L_1''$ of the loop 70.

Moreover, the transformer signal derived from the loop 70, when it is connected to the detector and amplifier 52, may be used to adjust the phase setting of the phase-sensitive detector by adjusting the setting until the transformer signal disappears, thereby optimizing the phase setting for the flow measurements so as to ignore the quadrature error signal which is in phase quadrature with respect to the magnetic field and to sense only the flow signal which is in phase with the magnetic field.

It should be noted that, if desired, the leads $L_1'$, $L_1''$ and 66 may be encased in a Teflon jacket or bonded to each other to form a bifilar lead. When polyurethane insulated wires are used, the bifilar lead may be formed by bonding them with a polyurethane cement (Uralane). This method yields the thinnest type of catheter lead wire stem. It is most convenient to use a prefabricated bifilar wire consisting, for example, of a Teflon insulated 9 mil Beryllium copper wire L bonded to a Teflon-insulated 3 mil copper wire $L_2$, to fabricate by appropriate bending and bonding the loop sensors illustrated in FIGS. 9, 9A and 9B.

The embodiment shown in FIG. 9 may be used and connected to electronic circuits exactly as the embodiment of FIG. 7. It has the advantage over the modification shown in FIG. 7 of elimination of the frame 17, relying on one of the lead wires to serve as a frame, which greatly simplifies and miniaturizes the sensor.

Figure 9A:
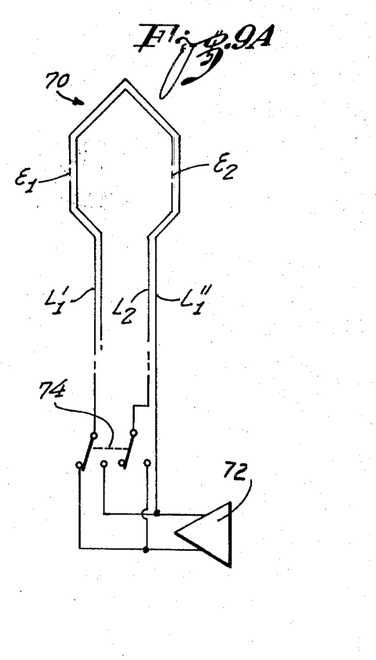
FIG. 9A shows a variant of FIG. 9.

FIG. 9A shows in schematic form a system similar to FIG. 9, but with certain modifications. As in FIG. 9, for mechanical convenience in fabrication, $L_1$ and $L_2$ consist of a bifilar wire, in which $L_1$ is of beryllium copper and $L_2$ is a thinner copper wire, forming the second of the two filaments in the bifilar conductor. Both wires are physically united and Teflon insulated, with the electrode $E_1$ being formed by removing a portion of the insulation from $L_1$ and the electrode $E_2$ being formed by removing a portion of the insulation from $L_2$. $L_2$ could be terminated at $E_2$ but for mechanical strength and convenience it is left in place and merely dead ended near the plug, the electrode $E_2$ being formed as mentioned by simply removing the insulation at that spot.

A single gated amplifier 72 may be used to measure both the loop signal and the flow signal in any suitable time sharing arrangement. Thus the amplifier 72, in conjunction with the double pole, double throw switch 74, serves the function of both the automatic gain control amplifier 60 and the flow detector amplifier 52 of FIG. 7. When the switch 74 is in the left hand position shown in FIG. 9A, the loop voltage generated in loop 70 and read out by the connection to the two leads $L_1'$ and $L_1''$, is measured. When the switch 74 is in the right hand position the two ends of the leads $L_1'$ and $L_1''$ are externally shorted together and connected as one input to the amplifier 72. The other input to 72 is then connected to $L_2$ and hence to $E_2$. This then measures the flow signal.

Figure 9B:
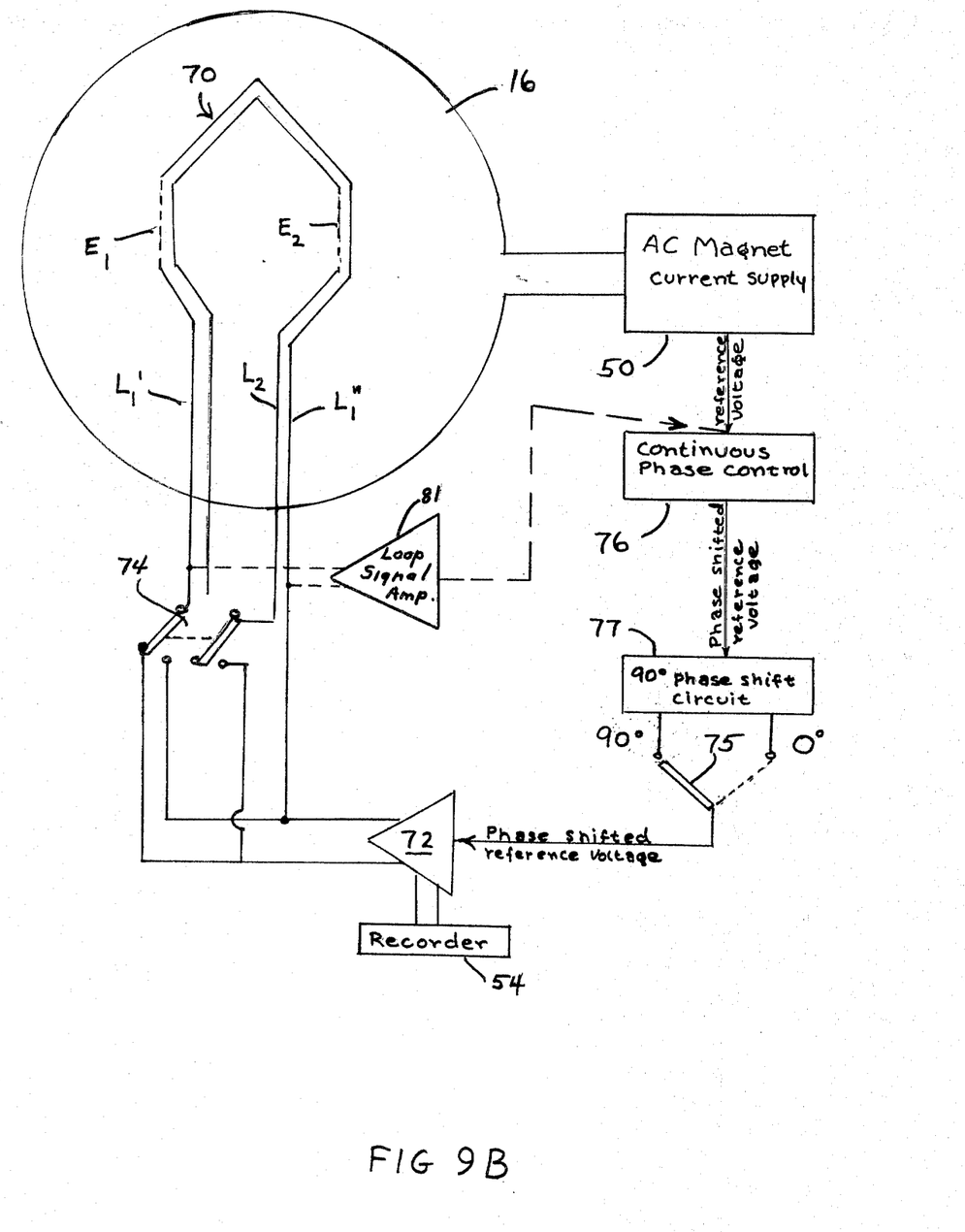
FIG. 9B shows a circuit employable with the probe of FIG. 9A.

The operation of the sensor and circuit shown in FIG. 9B proceeds as follows. (1) Switch 74 is in the left hand position and switch 75 is in the right hand position. The loop 70 is thus connected to the detector-amplifier 72 which, for proper operation, should be insensitive to the quadrature voltage phase, i.e., it should only sense flow signals in phase with the magnetic field. This is accomplished by a proper reference voltage supplied to the amplifier 72 from the magnet current supply 50 in accordance with well-established practice (Glasser. Medical Physics. 2, 141. Yearbook Publishing Co., 1960) via a double phase-shifting network (76 and 77). The circuit 76 permits a continuous variation of the phase of the reference voltage derived from the magnet current supply 50. The phase-shifted reference voltage put out by 76 can be phase-shifted abruptly by 90° after passing the circuit 77 or its phase may be left unchanged. This is indicated symbolically by the two positions of switch 75 which indicate the choice between two phases of the reference voltage derivable from the circuit 77 which differ by 90°. The 0° position of switch 75 corresponds to gating the amplifier 72 so that only signals in phase with the magnetic field are sensed and the 90° setting of switch 75 corresponds to amplifier gating set to sense only signals in phase-quadrature with respect to the magnetic field generated by coil 16 (such as the transformer emf induced in the loop 70).

As said above, switch 74 is in the left hand position and switch 75 is in the right hand position at the outset so that the loop 70 is connected to the input of detector-amplifier 72. At this setting the amplifier should be insensitive to the quadrature voltage derived from the loop 70. If the recorder 54 indicates an output from amplifier 72, the continuous phase control 76 is adjusted until this output becomes zero (see A. Kolin: Proc. Nat. Acad, Sci. 65, 521, 1970). The electronic system is now insensitive to the zero error signal and optimally sensitive to the flow signal which is in phase with the magnetic field. (2) If we now turn the switch 74 to the right hand position (leaving switch 75 unchanged) we are set to record flow signals with both switches (74 and 75) in the right hand position. (3) When both switches (74 and 75) are turned to the left hand position, the loop is again connected to the input of amplifier 72 but this time with its gate set by the 90° reference voltage so that the amplifier is insensitive to flow signals and only senses the transformer emf induced in the loop 70. As we have seen before, this signal is with a good approximation proportional to the product of the diameter of the conduit (artery or vein) in which the loop 70 is confined and the magnetic field component normal to the plane of the loop. This output is thus a measure of the flow-sensitivity of the overall system. It can be used either for calibration by comparison between the output encountered in a particular experiment and the output measured in a standard reference configuration or by adjusting this output always to a constant standard value thus maintaining always a constant flow sensitivity regardless of how the conduit diameter, the intensity and orientation of the magnetic field may change in the course of an experimental sequence.

The above switching and adjustment procedures may be carried out either manually or automatically and periodically with mechanical or electronic servo-controls programmed in a suitable time-sharing sequence. As an alternate, the reference voltage fed to box 76 may be derived from the loop 70 via a suitable amplifier 81, instead of from the AC magnet current supply 50. This is shown schematically by the dash lines in FIG. 9B.

An electromagnetic catheter type flow sensor-artery gauge is provided, therefore, which incorporates an external magnetic field exciting coil. The sensor of the gauge may be compressed into an extremely small lateral diameter for percutaneous introduction into a blood vessel via an angiographic catheter, for example, for clinical use of the gauge in measuring blood flow in blood vessels and recording of pulsatile changes in artery diameter. The gauge of the invention also includes simple and straight forward circuitry, for compensating for zero flow error signals, and for compensating for variations in effective magnetic field intensity, and for changes in the inter-electrode distance.

As mentioned above, the frame of the catheter probe, and the wire looped around it for sensing the quadrature voltage may have a generally lenticular, rhombical, hexagonal or polygonal shape, and the inter-electrode distance is represented by the shorter axis of the frame. Then, so long as the shorter transverse axis of the frame is less than half the length of the longitudinal axis, the output of the rhombical or hexagonal loop will be a reasonably accurate measure of the artery diameter over a wide range of artery sizes in an alternating magnetic field of constant amplitude and orientation relative to the plane of the loop.

While particular embodiments of the invention have been shown and described, modifications may be made, and it is intended in the following claims to cover all modifications which come within the spirit and scope of the invention.

What is claimed is:

1. Flow sensor comprising:
  resiliently deformable terminally closed loop means collapsible to an elongated narrow configuration closed at one end and having electrical terminals at the other end, and adapted for insertion and longitudinal disposition in a biological fluid-carrying conduit of an animal body and expandable to a broader configuration when in the conduit;
  sensor means supported by said loop means; and
  coil means adapted to carry an electric current for establishing a magnetic field within the conduit extending thereacross in the region of said sensor means.

2. The sensor defined in claim 1, in which said terminally closed loop means has a resilient wire-like construction.

3. The sensor defined in claim 2 wherein:
  said loop means is electrically insulated;
  said sensor means comprises a pair of electrodes supported respectively on opposite sides of said loop means; and also including:
  loop signal monitoring means electrically connected to said terminals, and
  flow detector and amplifier means connected to said electrodes.

4. The sensor defined in claim 1, wherein said sensor means includes at least one pair of electrodes mounted on transversely opposite sides of said terminally closed loop means for sensing induced flow signal.

5. The sensor defined in claim 1, wherein said sensor means includes a pair of electrodes, and which also includes electric circuitry means coupled to one of said electrodes for developing a signal indicative of the product of the magnetic field component perpendicular to the plane of said terminally closed loop means and the area circumscribed by said terminally closed loop means.

6. The sensor defined in claim 1, and wherein said coil means comprises an external coil having a cradle configuration for establishing a magnetic field perpendicular to said terminally closed loop means.

7. Flow sensor in accordance with claim 1, wherein said sensor means comprises:
a pair of spaced electrodes supported by said terminally closed loop means,
electric signal measuring means, and
circuit means for connecting said electrodes to said measuring means.

8. Flow sensor in accordance with claim 1, wherein said coil means includes means for positioning said coil means externally of the body.

9. The sensor defined in claim 8 wherein said sensor means includes at least one pair of electrodes mounted on transversely opposite sides of said terminally closed loop means for sensing induced flow signals.

10. The sensor defined in claim 1 and which includes:
second loop means extending around said terminally closed loop means for developing a signal indicative of the product of magnetic field component perpendicular to the plane of said loop means and the area circumscribed by said loop means.

11. The sensor defined in claim 1, wherein said sensor means includes a pair of electrodes, and which also includes electric circuitry connected to one of said electrodes and including electric leads extending outward from said electrode as a second loop means and passing around said terminally closed loop means so as to compensate induced quadrature error signals; and
electric circuitry connected to the other of said electrodes and leading to the exterior of the conduit without passing around said terminally closed loop means.

12. Flow sensor comprising:
resiliently deformable terminally closed loop means collapsible to an elongated narrow configuration to permit insertion into a conduit and expandable to a broader configuration when in the conduit;
sensor means supported by said loop means and including a first pair of electrodes;
a second pair of electrodes mounted on said terminally closed loop means and spaced along said terminally closed loop means from said first pair of electrodes for compensating induced quadrature error signals;
mixer means connected across said first and second pairs of electrodes;
utilization means connected to said first and second pairs of electrodes; and
coil means including means for positioning said coil externally of the conduit and carrying an electric current for establishing a magnetic field within the conduit extending thereacross in the region of said sensor means.

13. Flow sensor comprising:
resiliently deformable terminally closed loop means collapsible to an elongated narrow configuration and adapted for insertion into a conduit and expandable to a broader configuration when in the conduit;
sensor means supported by said loop means;
coil means adapted to be positioned externally of the conduit and carrying an electric current for establishing a magnetic field within the conduit extending thereacross in the region of said sensor means; and
second loop means extending around said terminally closed loop means for developing a signal indicative of the product of the magnetic field component perpendicular to the plane of said terminally closed loop means and the area circumscribed by said terminally closed loop means.

14. The sensor defined in claim 13, in which each of said loop means has a substantially rhombical configuration.

15. The sensor as defined in claim 13 in which each of said loop means has a generally hexagonal configuration.

16. The sensor as defined in claim 13 in which each of said loop means has a polygonal configuration.

17. Flow snesor comprising:
resiliently deformable terminally closed loop means collapsible to an elongated narrow configuration and adapted for insertion into a biological fluid-carrying conduit of an animal body and expandable to a broader configuration when in the conduit;
sensor means supported by said loop means and including a pair of electrodes;
coil means adapted to be positioned externally of the conduit and carrying an electric current for establishing a magnetic field within the conduit extending thereacross in the region of said sensor means;
electric circuitry connected to one of said electrodes and including electric leads extending outward from said electrode as a second loop means and passing around said terminally closed loop means so as to compensate induced quadrature error signals; and
electric circuitry connected to the other of said electrodes and leading to the exterior of the conduit without passing around said terminally closed loop means.

18. The sensor defined in claim 17, in which each of said loop means has a generally rhombus configuration.

19. The sensor as defined in claim 17 in which each of said loop means has a generally hexagonal configuration.

20. The sensor as defined in claim 17 in which each of said loop means have a polygonal configuration.

21. The sensor defined in claim 17, in which said electric circuitry includes:
a potentiometer,
a first pair of electric leads connecting a first electrode to both terminals of said potentiometer,
one of said leads adapted to extend directly to the exterior of the conduit and to one terminal of said potentiometer,
and the other of said leads extending around the closed end of said terminally closed loop means on a detoured path and thence adapted to extend to the exterior of the conduit and to the other terminal of said potentiometer, detector/amplifier means having input terminals connected to the potentiometer wiper, and to said other electrode, respectively.

22. The sensor defined in claim 21 and which includes:
phase sensitive detector and amplifier means for detecting signals between said electrodes in phase with the magnetic field of said coil means, and, alternately, signals in phase quadrature with respect to said magnetic field;
circuit means connecting the potentiometer wiper to one terminal of said detector and amplifier means,
and circuit means connected to the second of said electrodes and being adapted to lead directly out of the conduit and leading to the second terminal of said detector and amplifier means.

23. The sensor defined in claim 22, and which also includes quadrature phase detector and amplifier means connected in parallel with said detector and amplifier means, and
indicator means connected to the output of said quadrature phase detector and amplifier means to indicate when a phase error signal in quadrature with the magnetic field of said coil means, and developed at the input of said detector and amplifier means, is reduced to a minimum by adjustment of said wiper of said potentiometer.

24. The sensor defined in claim 21, in which:
a signal is developed within said second loop means indicative of the product of the magnetic field component perpendicular to the plane of said loop means and the area circumscribed by said loop means, and
means for monitoring said last named signal as a measure of the sensitivity of the system as it is affected by the orientation and location of the sensor relative to the said coil means, and by the diameter of the conduit.

25. The sensor as defined in claim 24 and which includes:
detector and amplifier means having its input connected to the wiper of said potentiometer and to the other of said electrodes,
and gain control means for controlling the sensitivity of said detector and amplifier means in accordance with, and in response to, said last named signal.

26. The sensor defined in claim 24, and which includes detector and amplifier means having its input connected to the wiper of said potentiometer and to the other of the aforesaid electrodes,
automatic gain control means for controlling the sensitivity of said amplifier means, and
circuit means for introducing the signal appearing across said potentiometer to said automatic gain control means.

27. A quadrature voltage suppressing flow sensor comprising:
resiliently deformable, terminally closed, loop means collapsible to an elongated narrow configuration closed at one end and having electrical terminals at the other end, and adapted to reside longitudinally in a conduit;
field means for establishing a magnetic field transversely to the plane of said loop means; and
detecting means connected to said terminals for detecting a changing magnetic flux linking said loop conductor means.

28. Flow sensor comprising:
a deformable loop means adapted to reside in a conduit;
field means for establishing a magnetic field transverse of said loop means;
sensor means supported by said loop means on opposite sides of said loop means;
said loop means including conductive loop conductor means for detecting a changing magnetic flux linking said loop conductor means, and
voltage sensing means connected to said loop conductor means for sensing voltage induced in said conductor means by changes in magnetic flux linking said loop conductor means.

29. Flow sensor in accordance with claim 28, including, detector means for detecting electrical signals sensed by said sensor means, and control means responsive to said induced voltage for modifying the detection characteristics of said detector means.

30. An electromagnetic type catheter gauge comprising:
a resilient insulated conductor in the form of a terminally closed loop collapsible to an elongated narrow configuration and adapted for insertion into a narrow conduit and expandable to a broader configuration when emerging from the narrow conduit into a wider conduit, said loop having a portion of the insulation removed to thereby have an exposed portion of said conductor, and form a first electrode;
a thin insulated conductor parallel to and contiguous with said resilient insulated conductor having a portion juxtapositioned within said loop and positioned apart from said exposed conductive portion, a part of said portion having the insulation removed to form a second electrode; and
a coil adapted to carry an electrical current for establishing a magnetic field within the conduit extending thereacross in the vicinity of said electrodes.

31. An electromagnetic type catheter gauge as defined in claim 30, wherein the ends of each conductor loop are connected together to form a first terminal;
a detector amplifier having two input terminals;
said first terminal being connected to one of said amplifier terminals and one end of said thin insulated conductor outside of said loop being connected to the other terminal of said amplifier.

32. An electromagnetic type catheter gauge as defined in claim 30, further comprising a detector amplifier having two input terminals and wherein the respective ends of said loop are connected to a respective one of said amplifier input terminals.

33. An electromagnetic type catheter gauge as defined in claim 30, wherein said insulated conductor loop in said broader configuration is comprised of six sides.

34. An electromagnetic type catheter gauge as defined in claim 33, wherein said first electrode is formed on one of said six sides by baring the insulation.

35. An electromagnetic type catheter gauge as defined in claim 30, wherein said insulated conductor loop in said broader configuration is polygonal in shape.

36. An electromagnetic type catheter gauge as defined in claim 30, wherein said second electrode is located at one end of said thin insulated conductor.

37. Gauge in accordance with claim 30 wherein said resilient insulated conductor and said thin insulated conductor are fabricated for a bifilar insulated conductor pair.

38. Electromagnetic catheter gauge comprising:
a terminally closed loop formed of an insulated conductor compressible into a thin elongate form and adapted to be inserted through a narrow tube into a blood vessel in a body, and being resiliently laterally expandable when in position in the blood vessel,
a pair of electric leads connected to the respective ends of said loop and adapted to extend from the blood vessel to the exterior of the body,
means forming a first sensing electrode on one side of said loop and electrically connected to the conductor forming said one side of said loop;
means forming a second electrode adjacent the opposite side of said loop substantially laterally opposite said first electrode,
a third electric lead connected to said second electrode means and adapted to extend from the blood vessel to the exterior of the body,
means for generating an alternating magnetic field having at least a component substantially normal to the plane of said loop when in its expanded configuration within the blood vessel,
potentiometer means having a pair of terminals and a wiper, said pair of terminals being connected respectively to said pair of leads,
flow signal detection means connected between one of said pair of leads and said wiper for detecting flow signal generated by blood flow in said magnetic field,
loop signal detecting means connected across said pair of leads for detecting the signal generated in said loop by said magnetic field, and
quadrature phase detecting means connected in parallel with said flow detecting means and including means connected to said magnetic field generating means for providing a reference signal for said quadrature phase detecting means and for said flow detecting means.

39. Flow sensor comprising:
resiliently deformable terminally closed loop means collapsible to an elongated narrow configuration and adapted to be inserted into a conduit through a small opening and expandable to a broader configuration with the conduit;
a first electrode on one side of said loop means, a second electrode on the other side of said loop means, an electrical lead connected to said second electrode and continuous and parallel to said other side of said loop means for connecting said second electrode to external circuitry;
an amplifier;
switching means for alternatively connecting the input of said amplifier either to (A) said electrodes respectively, or (B) to the terminals of said loop means;
magnet coil means for creating a magnetic field having a component normal to the plane of said loop means;
means for supplying an AC energizing current to said magnet coil;
means for applying to said amplifier a control signal of controllable phase and of the same frequency as said magnet current supply;
means for adjusting the phase of said control signal, and including a continuous phase control and an abrupt 90° phase shift control, whereby,
when said amplifier is connected to said loop means the phase of said control signal may be adjusted so as to suppress, in the amplifier output, signals applied to the amplifier which are in phase quadrature with respect to the magnetic field,
so that thereafter when the amplifier is connected to said electrodes, the flow signal appearing at the output of the amplifier is unmasked by said quadrature signal, thereby making the amplifier optimally sensitive to flow signal derived from the electrodes, which is in phase with the magnetic field, and
when said amplifier is connected to said loop means and the phase of said reference signal has been shifted through 90°, the amplifier senses only the transformer e.m.f. induced in said loop means, which is a function of the diameter of the conduit.

40. Flow sensor in accordance with claim 39 wherein said phase adjustable control signal is derived from said magnetic current supply.

41. Flow sensor in accordance with claim 39 wherein said phase adjustable control signal is derived from said loop means.

42. Apparatus comprising:
resiliently deformable terminally closed loop means collapsible to an elongated narrow configuration closed at one end and adapted for insertion and longitudinal disposition in a conduit through a small opening and expandable to a broader configuration when in the conduit;
electrode means connected to and supported by one side of said loop means, said electrode means being accessible electrically by either or both of the terminals of said loop means;
second electrode means supported by the other side of said loop means and electrically insulated therefrom; and
lead means providing access and terminal connections for said second electrodes means.

43. Flow sensor comprising:
resiliently deformable terminally closed loop means collapsible to an elongated narrow configuration to permit insertion into a conduit and expandable to a broader configuration when in the conduit;
sensor means supported by said loop means and including a first pair of electrodes;
a second pair of electrodes mounted on said terminally closed loop means and spaced along said terminally closed loop means from said first pair of electrodes for compensating induced quadrature error signals;
mixer means connected across said first and second pairs of electrodes;
utilization means connected to said first and second pairs of electrodes; and
coil means adapted to carry an electric current for establishing a magnetic field within the conduit extending thereacross in the region of said sensor means.

44. Catheter comprising:
resiliently deformable, terminally closed loop means, collapsible to an elongated narrow configuration closed at one end and having electrical terminals at the other end and adapted for insertion into a biological fluid-carrying conduit in an animal body, through a small opening and expandable to a broader configuration residing longitudinally in the conduit;

first electrode means mounted to one side of said loop means;

second electrode means mounted to the other side of said loop means; and lead means providing access and terminal connections to said respective electrode means.

* * * * *

UNITED STATES PATENT AND TRADEMARK OFFICE
CERTIFICATE OF CORRECTION

PATENT NO. : 3,757,773
DATED : September 11, 1973
INVENTOR(S) : Alexander Kolin

It is certified that error appears in the above-identified patent and that said Letters Patent are hereby corrected as shown below:

Column 1, Line 2, after "ARTERY" insert --GAUGE--.

Signed and Sealed this

Twenty-second Day of May 1979

[SEAL]

Attest:

RUTH C. MASON
*Attesting Officer*

DONALD W. BANNER
*Commissioner of Patents and Trademarks*